US012044800B2

(12) United States Patent
DeMersseman et al.

(10) Patent No.: US 12,044,800 B2
(45) Date of Patent: Jul. 23, 2024

(54) SCANNING LIDAR SYSTEM AND METHOD WITH COMPENSATION FOR TRANSMIT LASER PULSE EFFECTS (71) Applicant: Magna Electronics, LLC, Southfield, MI (US)

(72) Inventors: Bernard DeMersseman, Andover, MA (US); Afrah Naik, Waltham, MA (US); Winston Li, Auburndale, MA (US); Olov Von Hofsten, Stockholm (SE)

(73) Assignee: Magna Electronics, LLC, Southfield, MI (US)

( * ) Notice: Subject to any disclaimer, the term of this patent is extended or adjusted under 35 U.S.C. 154(b) by 863 days.

(21) Appl. No.: 17/149,239

(22) Filed: Jan. 14, 2021

(65) Prior Publication Data
US 2022/0221559 A1 Jul. 14, 2022

(51) Int. Cl.
*G01S 7/48* (2006.01)
*G01S 7/481* (2006.01)
*G01S 17/06* (2006.01)
*G01S 17/931* (2020.01)

(52) U.S. Cl.
CPC .......... *G01S 7/4812* (2013.01); *G01S 7/4815* (2013.01); *G01S 7/4817* (2013.01); *G01S 17/06* (2013.01); *G01S 17/931* (2020.01)

(58) Field of Classification Search
None
See application file for complete search history.

(56) References Cited

U.S. PATENT DOCUMENTS

| 1,520,245 | A | 12/1924 | Humbrecht |
| 3,712,985 | A | 1/1973 | Swarner et al. |
| 3,898,656 | A | 8/1975 | Jensen |
| 4,125,864 | A | 11/1978 | Aughton |
| 4,184,154 | A | 1/1980 | Albanese et al. |
| 4,362,361 | A | 12/1982 | Campbell et al. |
| 4,439,766 | A | 3/1984 | Kobayashi et al. |

(Continued)

FOREIGN PATENT DOCUMENTS

| AT | 509180 B1 | 1/2016 |
| AU | 6638286 A | 6/1987 |

(Continued)

OTHER PUBLICATIONS

International Search Report and Written Opinion for International Application No. PCT/US2020/064474, mailed on Apr. 1, 2021.

(Continued)

*Primary Examiner* — Hovhannes Baghdasaryan
(74) *Attorney, Agent, or Firm* — Burns & Levinson LLP; Daniel J. McGrath (57) ABSTRACT

A LiDAR system and method of detecting objects using same includes a plurality of coaxially arranged LiDAR transmitters and detectors. A movable optical element redirects optical signals between the LiDAR transmitters and an external region and reference optical element. The detectors receive returning optical signals after they have deflected off objects in the surrounding environment to generate an electrical signal. A reference signal is generated from the optical signals directed towards the reference optical element. The system determines the position of an object in the external region by adjusting the electrical signal using the reference signal.

20 Claims, 11 Drawing Sheets

(56) References Cited

U.S. PATENT DOCUMENTS

| | | |
|---|---|---|
| 4,765,715 A | 8/1988 | Matsudaira et al. |
| 4,957,362 A | 9/1990 | Peterson |
| 5,200,606 A | 4/1993 | Krasutsky et al. |
| 5,210,586 A | 5/1993 | Grage et al. |
| 5,274,379 A | 12/1993 | Carbonneau et al. |
| 5,428,215 A | 6/1995 | Dubois et al. |
| 5,604,695 A | 2/1997 | Cantin et al. |
| 5,793,491 A | 8/1998 | Wangler et al. |
| 5,889,490 A | 3/1999 | Wachter et al. |
| 5,966,226 A | 10/1999 | Gerber |
| 6,078,395 A | 6/2000 | Jourdain et al. |
| 6,122,222 A | 9/2000 | Hossack |
| 6,292,285 B1 | 9/2001 | Wang et al. |
| 6,384,770 B1 | 5/2002 | De Gouy |
| 6,437,854 B2 | 8/2002 | Hahlweg |
| 6,556,282 B2 | 4/2003 | Jamieson et al. |
| 6,559,932 B1 | 5/2003 | Halmos |
| 7,202,941 B2 | 4/2007 | Munro |
| 7,227,116 B2 | 6/2007 | Gleckler |
| 7,272,271 B2 | 9/2007 | Kaplan et al. |
| 7,440,084 B2 | 10/2008 | Kane |
| 7,483,600 B2 | 1/2009 | Achiam et al. |
| 7,489,865 B2 | 2/2009 | Varshneya et al. |
| 7,544,945 B2 | 6/2009 | Tan et al. |
| 7,570,347 B2 | 8/2009 | Ruff et al. |
| 7,675,610 B2 | 3/2010 | Redman et al. |
| 7,832,762 B2 | 11/2010 | Breed |
| 8,044,999 B2 | 10/2011 | Mullen et al. |
| 8,050,863 B2 | 11/2011 | Trepagnier et al. |
| 8,134,637 B2 | 3/2012 | Rossbach et al. |
| 8,223,215 B2 | 7/2012 | Oggier et al. |
| 8,363,511 B2 | 1/2013 | Frank et al. |
| 8,508,723 B2 | 8/2013 | Chang et al. |
| 8,629,975 B1 | 1/2014 | Dierking et al. |
| 8,742,325 B1 | 6/2014 | Droz et al. |
| 8,836,761 B2 | 9/2014 | Wang et al. |
| 8,836,922 B1 | 9/2014 | Pennecot et al. |
| 8,879,050 B2 | 11/2014 | Ko |
| 9,007,569 B2 | 4/2015 | Amzajerdian et al. |
| 9,063,549 B1 | 6/2015 | Pennecot et al. |
| 9,086,273 B1 | 7/2015 | Gruver et al. |
| 9,090,213 B2 | 7/2015 | Lawlor et al. |
| 9,097,646 B1 | 8/2015 | Campbell et al. |
| 9,140,792 B2 | 9/2015 | Zeng |
| 9,157,790 B2 | 10/2015 | Shpunt et al. |
| 9,267,787 B2 | 2/2016 | Shpunt et al. |
| 9,285,477 B1 | 3/2016 | Smith et al. |
| 9,482,412 B2 | 11/2016 | Schwaiger et al. |
| 9,575,162 B2 | 2/2017 | Owechko |
| 9,618,742 B1 | 4/2017 | Droz et al. |
| 9,651,417 B2 | 5/2017 | Shpunt et al. |
| 9,658,322 B2 | 5/2017 | Lewis |
| 9,696,427 B2 | 7/2017 | Wilson et al. |
| 9,711,493 B2 | 7/2017 | Lin |
| 9,753,351 B2 | 9/2017 | Eldada |
| 9,823,351 B2 | 11/2017 | Haslim et al. |
| 9,857,472 B2 | 1/2018 | Mheen et al. |
| 9,869,754 B1 | 1/2018 | Campbell et al. |
| 10,018,725 B2 | 7/2018 | Liu |
| 10,018,726 B2 | 7/2018 | Hall et al. |
| 10,024,655 B2 | 7/2018 | Raguin et al. |
| 10,078,133 B2 | 9/2018 | Dussan |
| 10,088,557 B2 | 10/2018 | Yeun |
| 10,148,060 B2 | 12/2018 | Hong et al. |
| 10,175,360 B2 | 1/2019 | Zweigle et al. |
| 10,183,541 B2 | 1/2019 | Van Den Bossche et al. |
| 10,369,922 B2 | 8/2019 | Nakashima et al. |
| 10,408,924 B2 | 9/2019 | Mheen |
| 10,411,524 B2 | 9/2019 | Widmer et al. |
| 10,416,292 B2 | 9/2019 | de Mersseman et al. |
| 10,473,767 B2 | 11/2019 | Xiang et al. |
| 10,473,784 B2 | 11/2019 | Puglia |
| 10,473,943 B1 | 11/2019 | Hughes |
| 10,551,501 B1 | 2/2020 | LaChapelle |
| 10,557,923 B2 | 2/2020 | Watnik et al. |
| 10,558,044 B2 | 2/2020 | Pan |
| 10,564,268 B2 | 2/2020 | Turbide et al. |
| 10,578,724 B2 | 3/2020 | Droz et al. |
| 10,627,493 B2 | 4/2020 | Morikawa |
| 10,678,117 B2 | 6/2020 | Shin et al. |
| 10,768,346 B2 | 9/2020 | Miner et al. |
| 10,775,508 B1 | 9/2020 | Rezk et al. |
| 10,937,773 B2 | 3/2021 | T'ng |
| 11,326,758 B1 | 5/2022 | De Mersseman |
| 2001/0052872 A1 | 12/2001 | Hahlweg |
| 2003/0043363 A1 | 3/2003 | Jamieson et al. |
| 2004/0028418 A1 | 2/2004 | Kaplan et al. |
| 2004/0031906 A1 | 2/2004 | Glecker |
| 2004/0135992 A1 | 7/2004 | Munro |
| 2004/0155249 A1 | 8/2004 | Narui et al. |
| 2005/0219506 A1 | 10/2005 | Okuda et al. |
| 2006/0072189 A1 | 4/2006 | DiMarzio et al. |
| 2006/0221250 A1 | 10/2006 | Rossbach et al. |
| 2006/0232052 A1 | 10/2006 | Breed |
| 2006/0239312 A1 | 10/2006 | Kewitsch et al. |
| 2007/0140613 A1 | 6/2007 | Achiam et al. |
| 2007/0181810 A1 | 8/2007 | Tan et al. |
| 2007/0211786 A1 | 9/2007 | Shatill |
| 2007/0219720 A1 | 9/2007 | Trepagnier et al. |
| 2008/0088499 A1 | 4/2008 | Bonthron et al. |
| 2008/0095121 A1 | 4/2008 | Shatill |
| 2008/0100510 A1 | 5/2008 | Bonthron |
| 2008/0219584 A1 | 9/2008 | Mullen et al. |
| 2008/0246944 A1 | 10/2008 | Redman et al. |
| 2009/0002680 A1 | 1/2009 | Ruff et al. |
| 2009/0010644 A1 | 1/2009 | Varshneya et al. |
| 2009/0190007 A1 | 7/2009 | Oggier et al. |
| 2009/0251361 A1 | 10/2009 | Bensley |
| 2010/0027602 A1 | 2/2010 | Abshire et al. |
| 2010/0128109 A1 | 5/2010 | Banks |
| 2010/0157280 A1 | 6/2010 | Kusevic et al. |
| 2010/0182874 A1 | 7/2010 | Frank et al. |
| 2012/0075422 A1 | 3/2012 | Wang et al. |
| 2012/0182540 A1 | 7/2012 | Suzuki |
| 2012/0206712 A1 | 8/2012 | Chang et al. |
| 2012/0236379 A1 | 9/2012 | da Silva et al. |
| 2012/0310516 A1 | 12/2012 | Zeng |
| 2012/0310519 A1 | 12/2012 | Lawlor et al. |
| 2013/0088726 A1 | 4/2013 | Goyal et al. |
| 2013/0093584 A1 | 4/2013 | Schumacher |
| 2013/0120760 A1 | 5/2013 | Raguin et al. |
| 2013/0166113 A1 | 6/2013 | Dakin et al. |
| 2013/0206967 A1 | 8/2013 | Shpunt et al. |
| 2013/0207970 A1 | 8/2013 | Shpunt et al. |
| 2013/0222786 A1 | 8/2013 | Hanson et al. |
| 2013/0250276 A1 | 9/2013 | Chang et al. |
| 2013/0265561 A1 | 10/2013 | Takahira et al. |
| 2014/0009747 A1 | 1/2014 | Suzuki et al. |
| 2014/0036252 A1 | 2/2014 | Amzajerdian et al. |
| 2014/0049609 A1 | 2/2014 | Wilson et al. |
| 2014/0152975 A1 | 6/2014 | Ko |
| 2014/0168631 A1 | 6/2014 | Haslim et al. |
| 2014/0233942 A1 | 8/2014 | Kanter |
| 2014/0313519 A1 | 10/2014 | Shpunt et al. |
| 2015/0009485 A1 | 1/2015 | Mheen et al. |
| 2015/0055117 A1 | 2/2015 | Pennecot et al. |
| 2015/0234308 A1 | 8/2015 | Lim et al. |
| 2015/0260843 A1 | 9/2015 | Lewis |
| 2015/0301162 A1 | 10/2015 | Kim |
| 2015/0371074 A1 | 12/2015 | Lin |
| 2015/0378011 A1 | 12/2015 | Owechko |
| 2016/0047895 A1 | 2/2016 | Dussan |
| 2016/0047896 A1 | 2/2016 | Dussan |
| 2016/0047903 A1 | 2/2016 | Dussan |
| 2016/0138944 A1 | 5/2016 | Lee et al. |
| 2016/0178749 A1 | 6/2016 | Lin et al. |
| 2016/0200161 A1 | 7/2016 | Van Den Bossche et al. |
| 2016/0245902 A1 | 8/2016 | Watnik et al. |
| 2016/0280229 A1 | 9/2016 | Kasahara |
| 2016/0291160 A1 | 10/2016 | Zweigle et al. |
| 2016/0357187 A1 | 12/2016 | Ansari |
| 2016/0363669 A1 | 12/2016 | Liu |
| 2016/0380488 A1 | 12/2016 | Widmer et al. |
| 2017/0023678 A1 | 1/2017 | Pink et al. |

(56) References Cited

U.S. PATENT DOCUMENTS

| | | |
|---|---|---|
| 2017/0090013 A1 | 3/2017 | Paradie et al. |
| 2017/0102457 A1 | 4/2017 | Li |
| 2017/0199273 A1 | 7/2017 | Morikawa et al. |
| 2017/0219696 A1 | 8/2017 | Hayakawa et al. |
| 2017/0269215 A1 | 9/2017 | Hall et al. |
| 2017/0270381 A1 | 9/2017 | Itoh et al. |
| 2017/0285346 A1 | 10/2017 | Pan |
| 2017/0307736 A1 | 10/2017 | Donovan |
| 2017/0307737 A1 | 10/2017 | Ishikawa et al. |
| 2017/0310948 A1 | 10/2017 | Pei |
| 2017/0329010 A1 | 11/2017 | Warke et al. |
| 2017/0329011 A1 | 11/2017 | Warke et al. |
| 2018/0052378 A1 | 2/2018 | Shin et al. |
| 2018/0113193 A1 | 4/2018 | Huemer |
| 2018/0128903 A1 | 5/2018 | Chang |
| 2018/0136328 A1 | 5/2018 | Moss |
| 2018/0143309 A1 | 5/2018 | Pennecot et al. |
| 2018/0180718 A1 | 6/2018 | Lin |
| 2018/0224529 A1 | 8/2018 | Wolf et al. |
| 2018/0241477 A1 | 8/2018 | Turbide et al. |
| 2018/0275249 A1 | 9/2018 | Campbell et al. |
| 2018/0275275 A1 | 9/2018 | Lundquist |
| 2018/0284237 A1 | 10/2018 | Campbell |
| 2018/0284282 A1 | 10/2018 | Hong et al. |
| 2018/0284286 A1 | 10/2018 | Eichenholz |
| 2018/0286909 A1 | 10/2018 | Eichenholz et al. |
| 2018/0306913 A1 | 10/2018 | Bartels |
| 2018/0341009 A1 | 11/2018 | Niclass et al. |
| 2018/0364334 A1 | 12/2018 | Xiang et al. |
| 2018/0372870 A1 | 12/2018 | Puglia |
| 2019/0018143 A1 | 1/2019 | Thayer et al. |
| 2019/0101644 A1 | 4/2019 | DeMersseman et al. |
| 2019/0113200 A1 | 4/2019 | Murakami |
| 2019/0123508 A1 | 4/2019 | Hong et al. |
| 2019/0129009 A1 | 5/2019 | Eichenholz et al. |
| 2019/0139951 A1 | 5/2019 | T'Ng et al. |
| 2019/0146060 A1 | 5/2019 | Qiu et al. |
| 2019/0195990 A1 | 6/2019 | Shand |
| 2019/0221988 A1 | 7/2019 | Villeneuve et al. |
| 2019/0235064 A1 | 8/2019 | Droz et al. |
| 2019/0242978 A1 | 8/2019 | Weed et al. |
| 2019/0265336 A1 | 8/2019 | Zhang et al. |
| 2019/0310351 A1 | 10/2019 | Hughes et al. |
| 2020/0081129 A1 | 3/2020 | de Mersseman et al. |
| 2020/0088847 A1 | 3/2020 | DeMersseman et al. |
| 2020/0249354 A1 | 8/2020 | Yeruhami et al. |
| 2020/0284906 A1 | 9/2020 | Eichenholz et al. |
| 2020/0341120 A1 | 10/2020 | Ahn |
| 2020/0341121 A1 | 10/2020 | Ahn |
| 2021/0018602 A1 | 1/2021 | de Mersseman et al. |
| 2021/0190919 A1 | 6/2021 | De Mersseman |
| 2022/0146817 A1 | 5/2022 | Erdl et al. |
| 2022/0333757 A1 | 10/2022 | Li et al. |
| 2022/0403998 A1 | 12/2022 | De Mersseman et al. |

FOREIGN PATENT DOCUMENTS

| | | |
|---|---|---|
| CN | 102508258 A | 6/2012 |
| DE | 19731754 A1 | 2/1999 |
| DE | 19757840 C1 | 9/1999 |
| DE | 102004033944 A | 2/2006 |
| DE | 102006031114 B4 | 7/2008 |
| DE | 102008045387 A1 | 3/2010 |
| DE | 102014218957 A1 | 3/2016 |
| DE | 102015217908 A1 | 3/2017 |
| DE | 102015224692 A1 | 6/2017 |
| DE | 102016201606 A1 | 8/2017 |
| EP | 0112188 B1 | 6/1987 |
| EP | 0578129 A2 | 1/1994 |
| EP | 2124069 A1 | 11/2009 |
| EP | 2696166 A3 | 12/2014 |
| EP | 2824418 A1 | 1/2015 |
| EP | 3203259 A1 | 8/2017 |
| EP | 3457080 A1 | 3/2019 |
| EP | 3147685 B1 | 1/2020 |
| GB | 0117750 A | 9/2001 |
| IT | 201800001765 A1 | 7/2019 |
| JP | 2002148556 A | 5/2002 |
| JP | 2018041723 A | 3/2018 |
| KR | 20190105889 A | 9/2019 |
| WO | 1994019705 A1 | 9/1994 |
| WO | 2008008970 A3 | 1/2008 |
| WO | 2015014556 A3 | 2/2015 |
| WO | 2016072483 A1 | 5/2016 |
| WO | 2016097409 A3 | 6/2016 |
| WO | 2016204139 A1 | 12/2016 |
| WO | 2018229131 A1 | 12/2018 |
| WO | 2019050643 A1 | 3/2019 |
| WO | 2019099166 A1 | 5/2019 |
| WO | 2020243038 A1 | 12/2020 |

OTHER PUBLICATIONS

International Search Report and Written Opinion for International Application No. PCT/US2018/057676, mailed on Jan. 23, 2019.
International Search Report and Written Opinion for International Application No. PCT/US2018/052849, mailed on May 6, 2019.
International Search Report and Written Opinion for International Application No. PCT/US2019/046800, mailed on Nov. 25, 2019.
Kasturi et al., UAV-Bome LiDAR with MEMS Mirror Based Scanning Capability; SPIE Defense and Commercial Sensing Conference 2016, Baltimore, MD; 10 pages, 2016.
Internet URL: https://www.continental-automotive.com/en-gl/Passenger-Cars/Chassis-Safety/Advanced-Driver-Assistance-Systems/Cameras [retrieved on Dec. 20, 2018].
Internet URL: https://www.continental-automotive.com/en-gl/Passenger-Cars/Chassis-Safety/Advanced-Driver-Assistance-Systems/Cameras/Multi-Function-Camera-with-Lidar [retrieved on Dec. 20, 2018].
Hi-Res 3d Flash LIDAR will Supplement Continental's Existing Portfolio for Automated Driving [online], Press Release, Mar. 3, 2016, [retrieved on Dec. 20, 2018]. Retrieved from the Internet URL: https://www.continental-corporation.com/en/press/press-releases/hi-res-3d-flash-lidar-will-supplement-continental-s-existing-portfolio-for-automated-driving-15758.
A milestone for laser sensors in self-driving cars [online], Trade Press, Jul. 11, 2016, [retrieved on Dec. 19, 2018]. Retrieved from the Internet URL: https://www.osram.com/os/press/press-releases/a_milestone_for_lasersensors_in_self-driving_carsjsp.
Hewlett-Packard Application Note 77-4, Swept-Frequency Group Delay Measurements, Hewlett-Packard Co., September, 7 pages, 1968.
Kravitz et al., High-Resolution Low-Sidelobe Laser Ranging Based on Incoherent Pulse Compression, IEEE Jhotonic,s Technology Letters, vol. 24, No. 23, pp. 2119-2121, 2012.
Journet et al., A Low-Cost Laser Range Finder Based on an FMCW-like Method, IEEE Transactions on nstrumentation and Measurement, vol. 49, No. 4, pp. 840-843, 2000.
Campbell et al., Advanced Sine Wave Modulation of Continuous Wave Laser System for Atmospheric CO2 Differential Absorption Measurements; NASA Langley Research Center, 32 pages, 2018.
Levanon et al., Non-coherent Pulse Compression-Aperiodic and Periodic Waveforms; The Institution of Engineering and Technology, 9 pages, 2015.
Peer et al., Compression Waveforms for Non-Coherent Radar, Tel Aviv University, 6 pages, 2018.
Li, Time-of-Flight Camera—An Introduction, Technical White Paper, SLOA190B, Texas Instruments, 10 pages, 2014.
Pierrottet et al., Linear FMCW Laser Radar for Precision Range and Vector Velocity Measurements, Coherent Applications, Inc., NASA Langley Research Center, 9 pages, 2018.
Kahn, Modulation and Detection Techniques for Optical Communication Systems, Stanford University, Department of Electrical Engineering, 3 pages, 2006.
Niclass et al., Development of Automotive LIDAR, Electronics and Communications in Japan, vol. 98, No. 5, 6 pages, 2015.

(56) References Cited

OTHER PUBLICATIONS

Su et al, 2-D FFT and Time-Frequency Analysis Techniques for Multi-Target Recognition of FMCW Radar Signal, Proceedings of the Asia-Pacific Microwave Conference 2011, pp. 1390-1393.
Wojtkiewicz et al, Two-Dimensional Signal Processing in FMCW Radars, Instytut Podstaw Elektroniki Politechnika Warszawska, Warszawa, 6 pages, 2018.
Winkler, Range Doppler Detection for Automotive FMCW Radars, Proceedings of the 4th European Radar Conference, Munich Germany, 4 pages, 2007.
Li et al., Investigation of Beam Steering Performances in Rotation Risley-Prism Scanner, Optics Express, vol. 24, No. 12, 11 pages, 2016.
Thorlabs Application Note, Risley Prism Scanner, 33 pages, 2018.
Simpson et al., Intensity-Modulated, Stepped Frequency CW Lidar for Distributed Aerosol and Hard Target Measurements, Applied Optics, vol. 44, No. 33, pp. 7210-7217, 2005.
Skolnik, Introduction to Radar Systems, 3rd Edition, McGraw-Hill, New York, NY 2001, pp. 45-48.
Wang et al., Range-Doppler image processing in linear FMCW Radar and FPGA Based Real-Time Implementation, Journal of Communication and Computer, vol. 6, No. 4, 2009.
International Search Report and Written Opinion for International Application No. PCT/US2018/057727 dated Jan. 28, 2019.
International Search Report and Written Opinion for International Application No. PCT/US2018/052837 dated Jan. 24, 2019.
International Search Report and Written Opinion for International Application No. PCT/US2017/033263 dated Aug. 29, 2017.
International Search Report and Written Opinion for International Application No. PCT/US2018/048869 dated Nov. 8, 2018.
International Search Report and Written Opinion for International Application No. PCT/US2018/051281 dated Nov. 22, 2018.
International Search Report and Written Opinion for International Application No. PCT/US2018/054992 dated Dec. 11, 2018.
International Search Report and Written Opinion for International Application No. PCT/US2018/049038 dated Dec. 12, 2018.
International Search Report and Written Opinion for International Application No. PCT/US2017/033265 dated Sep. 1, 2017,.
International Search Report and Written Opinion for International Application No. PCT/US2017/033271 dated Sep. 1, 2017.
Invitation to Pay Additional Fees for International Application No. PCT/US2018/052849 dated Mar. 8, 2019.
http://www.advancedscientificconcepts.com/products/overview.html.
Roncat, Andreas, The Geometry of Airborne Laser Scanning in a Kinematical Framework, Oct. 19, 2016, www.researchgate.net/profile/Andreas_Roncat/publication/310843362_The_Geometry_of_Airborne_LaserScanningin_a_Kinematical_Frameworldinks/5839add708ae3a74b49ea03b1The-Geometry-of-Airborne-Laser-Scanning-in-a-Kinematical-Framework.pdf.
International Search Report and Written Opinion for International Application No. PCT/US2020/039760, mailed on Sep. 18, 2020.
Church et al., "Evaluation of a steerable 3D laser scanner using a double Risley prism pair," SPIE Paper.
Luhmann, "A historical review on panorama photogrammetry," http://www.researchgate.net/publication/228766550.
First Office Action of Chinese Patent Application No. 201980054217.1 mailed on Sep. 14, 2023.
1 Communication from EP Application No. 18773034.6 dated Sep. 13, 2021.
Notice of Registration and Notice of the Granting of a Patent Right for an Invention issued in CN Application No. 201980054217.1, mailed on Feb. 5, 2024.
International Search Report and Written Opinion issued in International Application No. PCT/US2023/034131 on Dec. 21, 2023.
International Search Report and Written Opinion issued in International Application No. PCT/US2023/034129 on Jan. 3, 2024.

SCANNING LIDAR SYSTEM AND METHOD WITH COMPENSATION FOR TRANSMIT LASER PULSE EFFECTS

BACKGROUND

1. Technical Field

The present disclosure is related to LiDAR systems and, in particular, to a scanning coaxial LiDAR system and method of using same with compensation for the effects caused by the transmit laser pulse, which can be used in an automotive or other motor vehicle application.

2. Discussion of Related Art

Vehicles often include detection systems which can be used for collision avoidance, self-driving, cruise control, and the like. LiDAR, which is an acronym for light detection and ranging, can be used to detect and range objects as part of such a system.

In a pulsed LiDAR system, a light pulse is sent out and the returning reflection has to be detected to determine the time-of-flight and the range to the object. The output laser power has to be as low as possible due to power consumption, laser lifetime, laser cost, and eye safety constraints. This results in low signal levels that, in combination with strong ambient light, gives very low signal to noise levels. There is therefore a need to optimize the method of detecting the signal peak to increase the range performance of the LiDAR system, especially when detecting dark, low reflectivity objects.

A coaxial LiDAR system uses the same optics for both transmit and receive light. There are many benefits with a coaxial configuration, including good matching between transmit and receive beams and high stability as the laser transmitters and detectors can be placed close to each other. One of the main problems with a coaxial system is that the transmit laser pulse saturates the detector for a short period of time and/or distorts the detector signal for some time period, usually due to reflections and scattering in the LiDAR. This effect, sometimes referred to as "self pulse" or "big bang", makes it difficult to detect peaks and objects close to the LiDAR system.

As such, there is a need for a coaxial detection system, and method of operating same, that can accurately detect objects at low signal levels.

SUMMARY

In at least one aspect, the subject technology relates to a LiDAR system. The system includes an optical source for generating an optical signal. The system includes a first movable optical element having an at least partially optically reflective surface for redirecting the optical signal. The first movable optical element is movable through a plurality of positions corresponding to a respective plurality of directions of the optical signal reflected from the movable optical element, the directions including a plurality of first directions resulting in an output optical signal being directed though an output of the LiDAR system to an external region, and at least one second direction resulting in the optical signal being reflected from the movable optical element to a reference optical element of the system. The reference optical element is adapted to return a reference signal indicative of a self-pulse of the LiDAR system. The system includes a detector configured to detect optical energy and generate an electrical signal indicative of the optical energy detected by the detector. The system includes a processor for receiving and storing the electrical signal indicative of the optical energy and the reference signal. The processor is configured to determine a position of at least one object by adjusting the electrical signal indicative of the optical energy detected by the detector using the reference signal.

In at least some embodiments, the processor adjusts the electrical signal by subtracting the reference signal. In some cases, the reference optical element is a light trap.

In some embodiments, first movable optical element is rotatable about an axis and is polygonal in a cross-section taken orthogonal to the axis. The first movable optical element can be rotatable about the axis to scan the output optical signal over the external region in a first dimension.

In some embodiments, the system can include a second movable optical element disposed optically between the optical source and the first movable optical element. The first movable optical element can then be rotatable about an axis and polygonal in cross section orthogonal to the axis, while the second movable optical element is a wedge mirror. Further, the first movable optical element can be rotatable to scan the output optical signal over the external region in a first dimension. The second movable optical element can then be movable to scan the output optical signal over the external region in a second dimension orthogonal to the first dimension.

In some embodiments, the processor is configured to determine whether a pulse shape of the reference signal is stable and adjust the electrical signal by subtracting the reference signal from the electrical signal only when the pulse shape of the reference signal is stable.

In at least one aspect, the subject technology relates to a method for detecting objects in an external region using a LiDAR system. The method includes transmitting a plurality of optical signals with a plurality of LiDAR transmitters. A plurality of LiDAR detectors are positioned coaxially with the LiDAR transmitters. A first movable optical element is provided, the first movable optical element having an at least partially optically reflective surface. The first movable optical element is positioned to redirect the optical signals from the LiDAR transmitters such that the first movable optical element is configured to redirect light between a plurality of first directions and at least one second direction. The first directions result in an output optical signal being output into the external region and the at least one second direction results in the optical signals being transmitted to a reference optical element. The method includes detecting, by the LiDAR detectors, returning optical signals, and generating an electrical signal indicative of optical energy detected. The reference optical element generates a reference signal indicative of a self-pulse of the LiDAR system in response to the optical signal being transmitted to the reference optical element. A position is determined of at least one object in the external region by adjusting the electrical signal indicative of optical energy detected using the reference signal.

In some embodiments, the method includes adjusting, by the processor, the electrical signal by subtracting the reference signal. The reference optical element can be a light trap.

In some embodiments, the first movable optical element is rotatable about an axis and is polygonal in a cross-section taken orthogonal to the axis. The first movable optical element can then be rotated about the axis to scan the output optical signal over the external region in a first dimension.

In some embodiments, a second movable optical element is provided, the second movable optical element having an at least partially optically reflective surface. The second movable optical element can be positioned optically between the LiDAR transmitters and the first movable optical element, the second optical element being configured to redirect light between the LiDAR transmitters and the first movable optical element. The first movable optical element can be rotated about an axis, the first movable optical element being polygonal in a cross section orthogonal to the axis. In some cases, the second movable optical element is a wedge mirror. Further, the first movable optical element can then be rotated to scan the output optical signal over the external region in a first dimension. Additionally, the second movable optical element can be moved to scan the output optical signal over the external region in a second dimension orthogonal to the first dimension.

In some embodiments, the processor is configured to determine whether a pulse shape of the reference signal is stable and adjust the electrical signal by subtracting the reference signal from the electrical signal only when the pulse shape of the reference signal is stable.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

The subject technology overcomes many of the prior art problems associated with vehicle detection systems. In brief summary, in at least some embodiments, the subject technology provides a LiDAR system which makes adjustments based on a reference signal, as discussed in more detail herein. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be at a higher elevation).

Referring now to FIGS. 1-7, a scanning LiDAR system 100 for a vehicle in accordance with the subject technology is shown. The system 100 can be mounted on or within a vehicle (not distinctly shown) and can be used generally to gather information and data on the surrounding external environment.

The LiDAR system 100 includes the necessary components for target detection using LiDAR as are found in typical LiDAR systems known in the art. To that end, the LiDAR system 100 includes an optical source 102 for transmitting optical signals into the surrounding environment, and detectors 104 for receiving returning optical energy that has reflected off objects within the environment. The optical source 102 can be an array of LiDAR transmitters, each transmitter being a laser diode configured to generate a pulsed laser or light beam 110. The transmitted light beams 110 pass through a lens 106 within a lens housing 108, the lens 106 being one or more panels of curved glass which acts to collimate the transmitted (and returning) light beams 110. The transmitted light beams 110 are redirected by two movable optical elements 112, 114 with reflective surfaces.

In the embodiment shown, the movable optical elements 112, 114 include a wedge mirror 112 and a reflecting member 114, although it should be understood that different movable optical elements (or different positioning of the optical elements) can be used in other embodiments. An actuator (not distinctly shown) causes the wedge mirror 112 to rotate or oscillate around an axis to redirect transmitted light beams 110 between the lens 106 and the reflecting member 114. Movement of the wedge mirror 112 changes the optical path of the transmitted light beams 110 in the azimuth and/or elevation direction, causing the LiDAR system 100 to scan in the elevation and azimuth directions when the transmitted light beams 110 are output into the environment. Likewise, an actuator (not distinctly shown) rotates the reflective member 114 around an axis "a" extending in the vertical ("z") direction. The reflective member has a polygonal shape, and in the embodiment shown, has four different sides 124. While the exemplary reflective member 104 is a four sided polygon, which has been found to be effective, different numbers of sides, or even a differently shaped reflective member 104, can be used. As the reflective member 114 rotates, different sides are exposed to the transmitted light beams 110 and the angle of each side changes with respect to the transmitted light beams 110. This results in a sweep in the azimuth direction when the transmitted light beams 110 are output into the surrounding environment.

Figure 1:
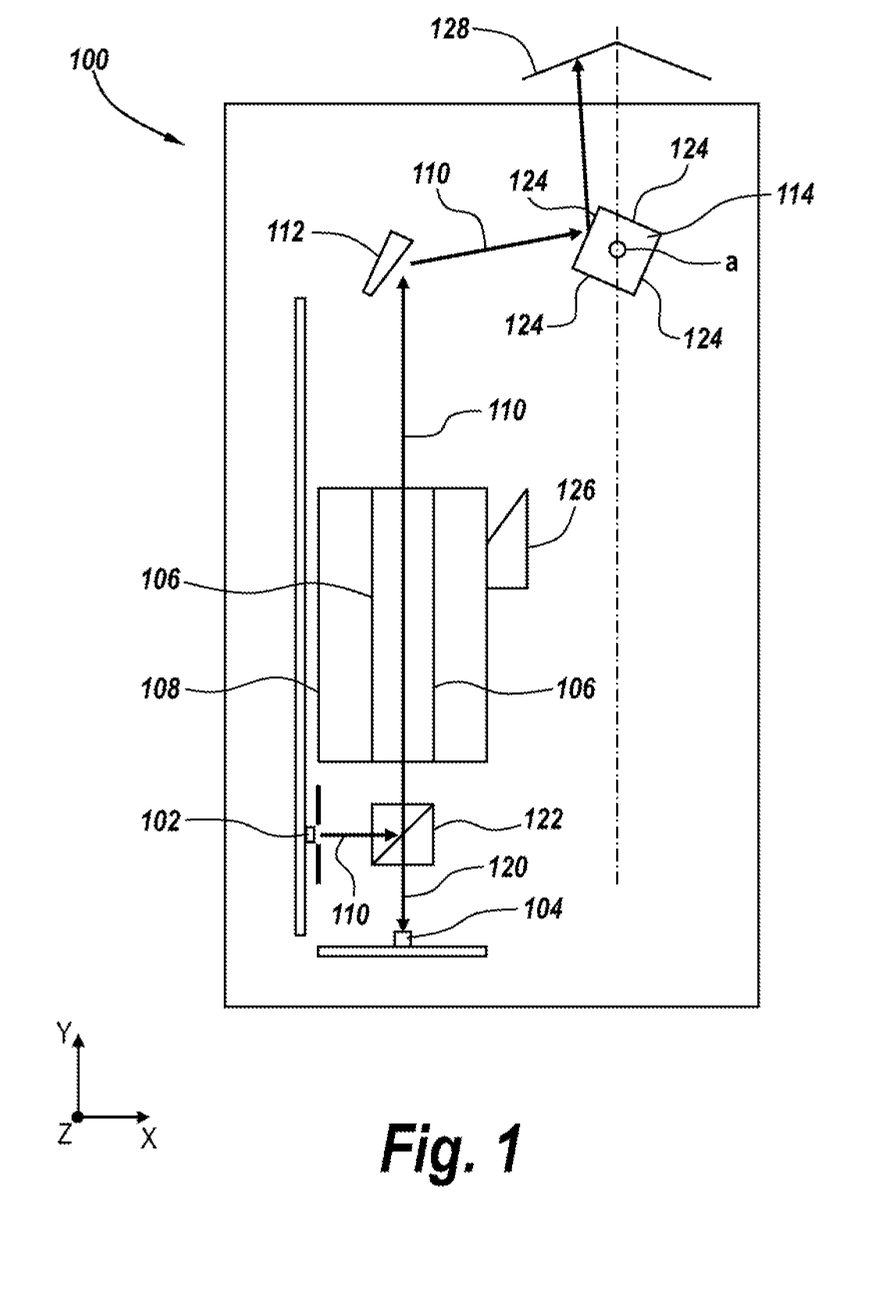
FIG. 1 is a block diagram of a LiDAR system in accordance with the subject technology.
Figure 2:
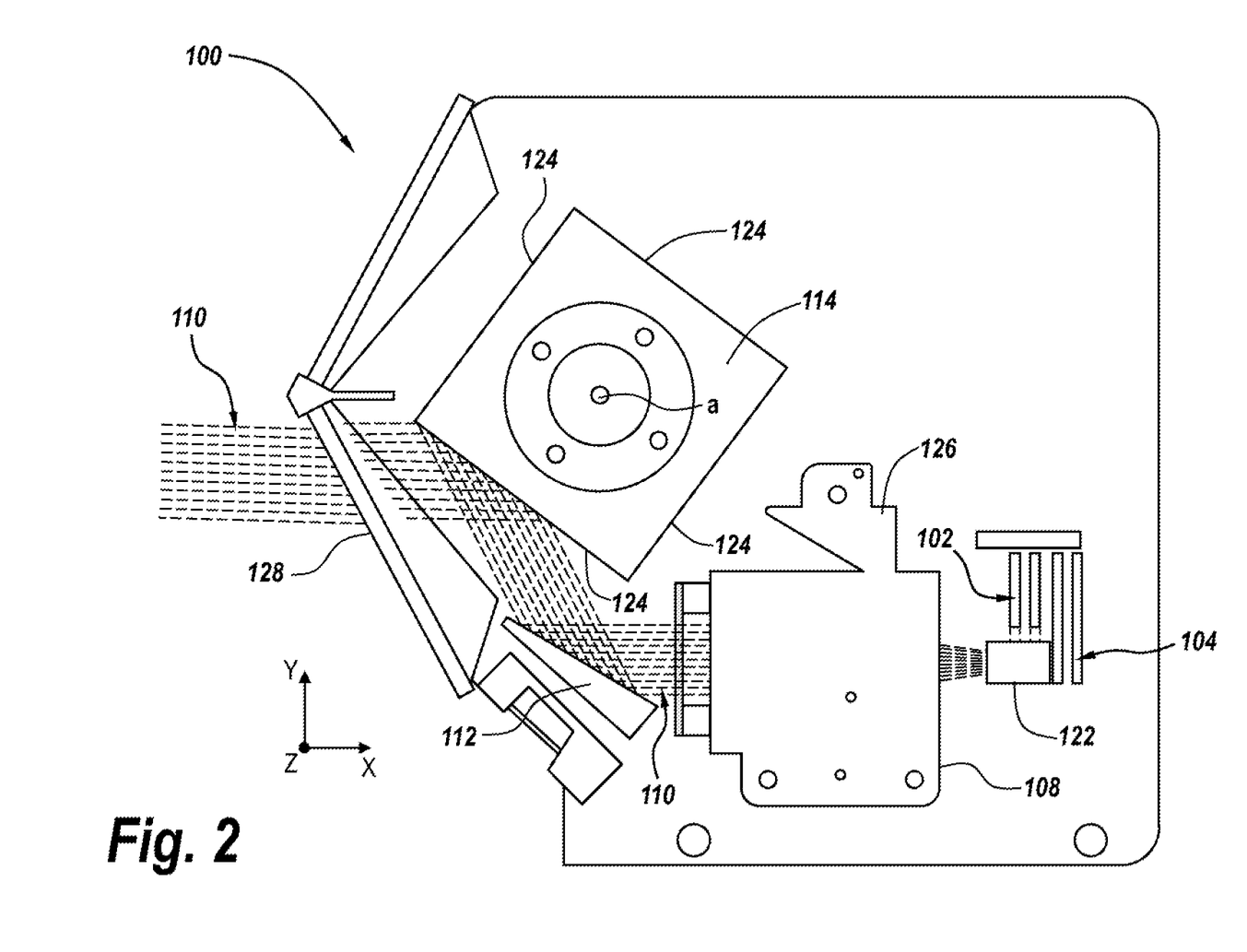
FIG. 2 is an overhead view of the LiDAR system of FIG. 1.
Figure 3:
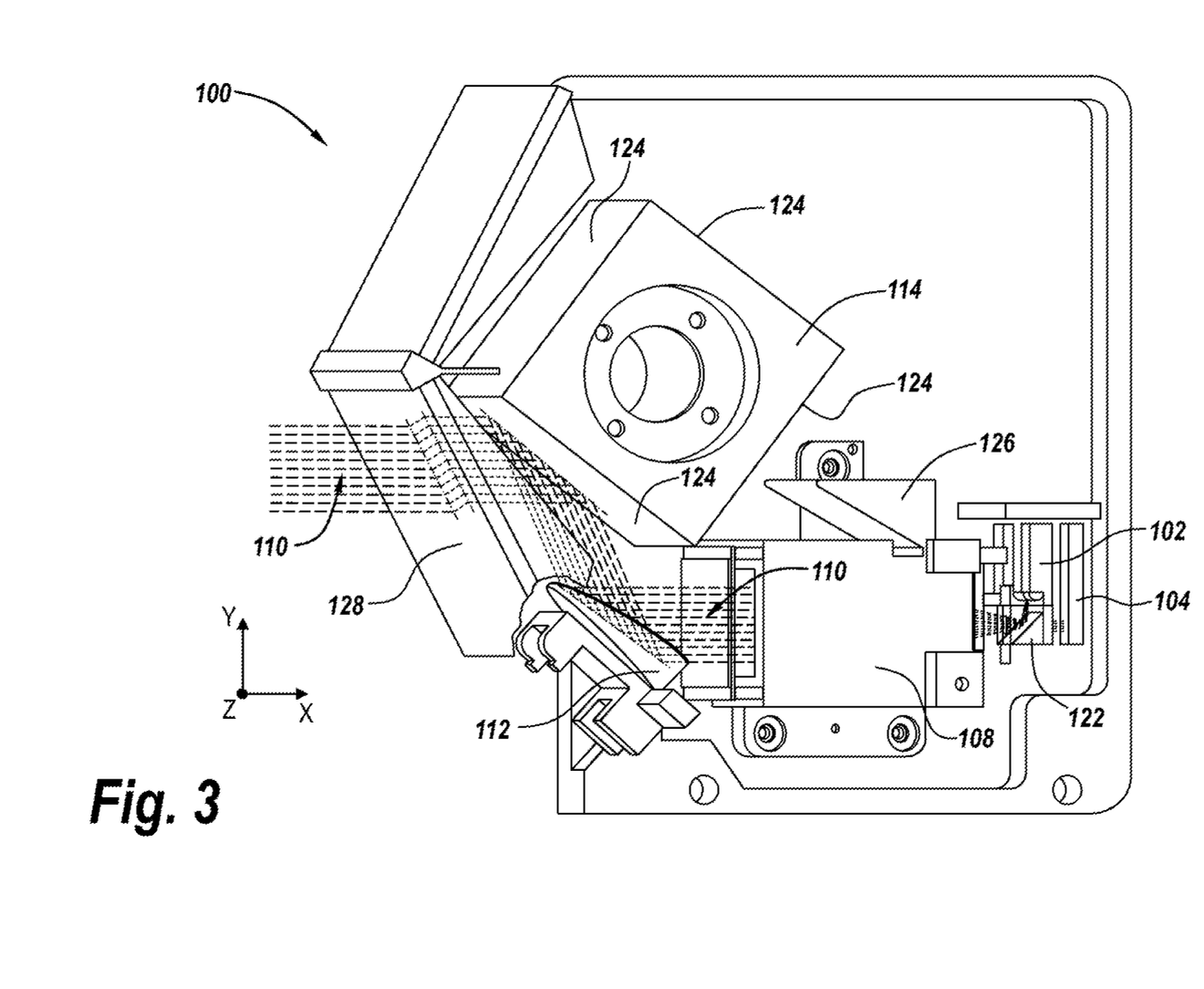
FIG. 3 is an overhead perspective view of the LiDAR system of FIG. 1.
Figure 4:
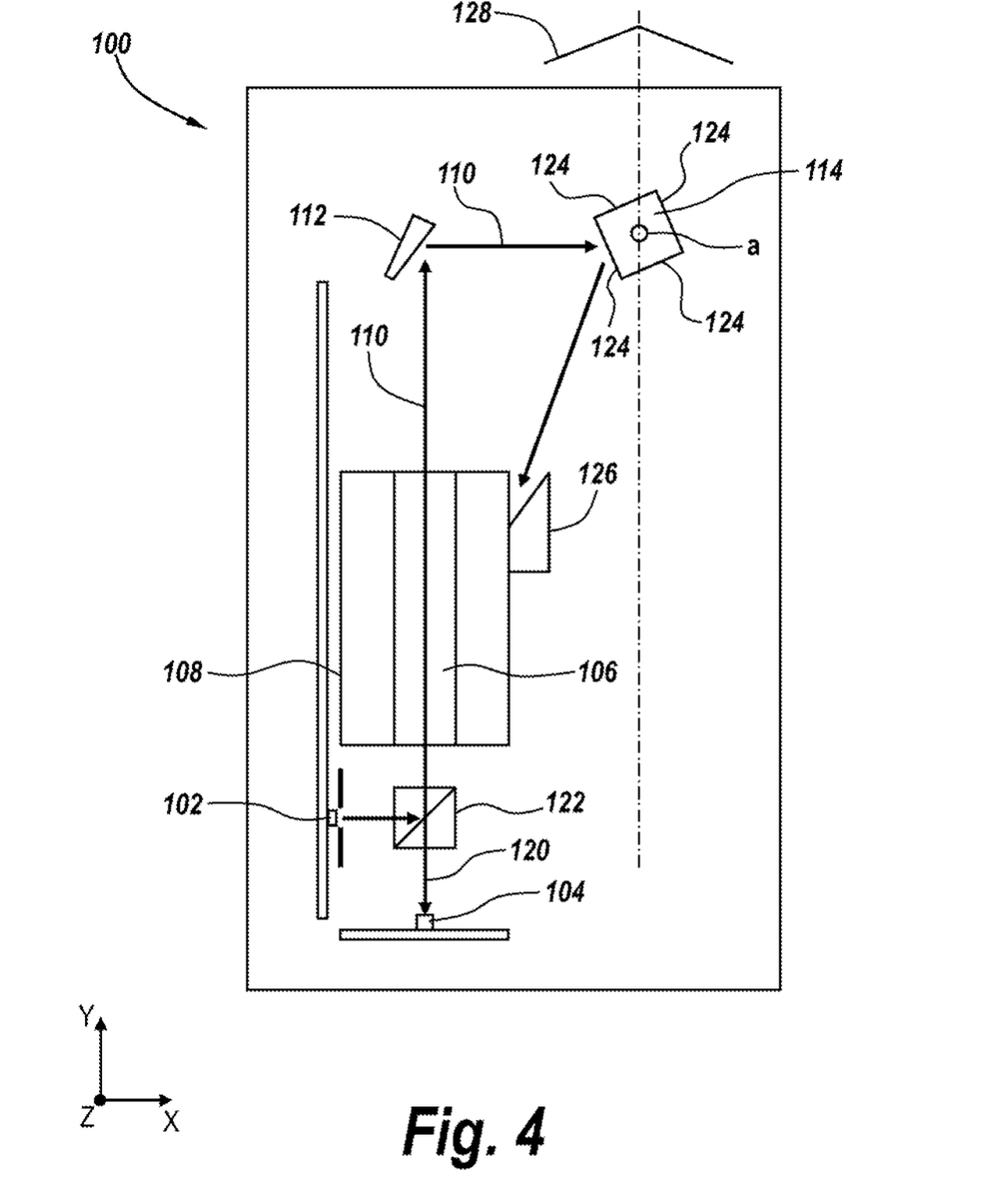
FIG. 4 is a block diagram of the LiDAR system of FIG. 1 showing an alternative position of the system components.
Figure 5:
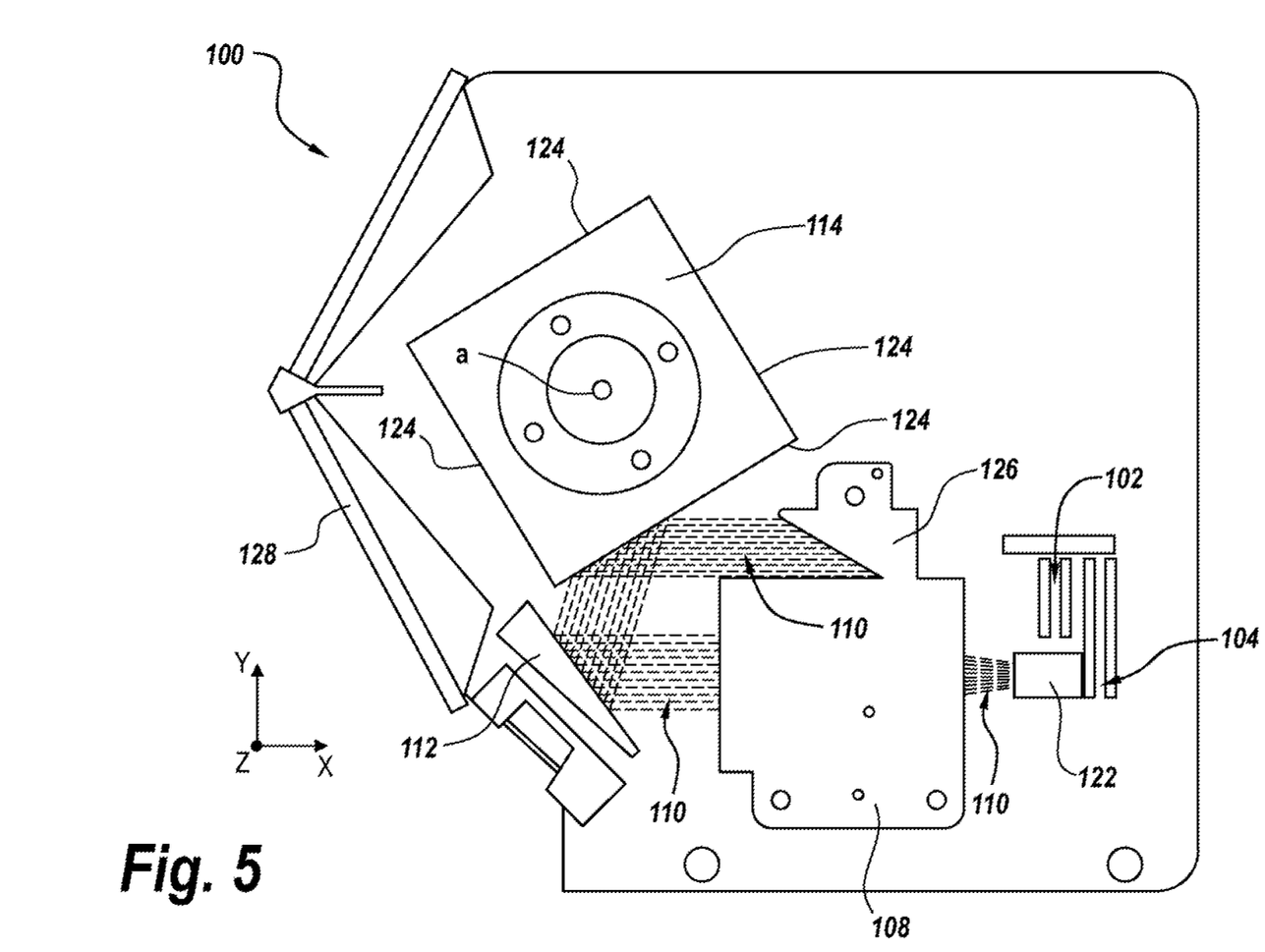
FIG. 5 is an overhead view of the LiDAR system of FIG. 4.
Figure 6:
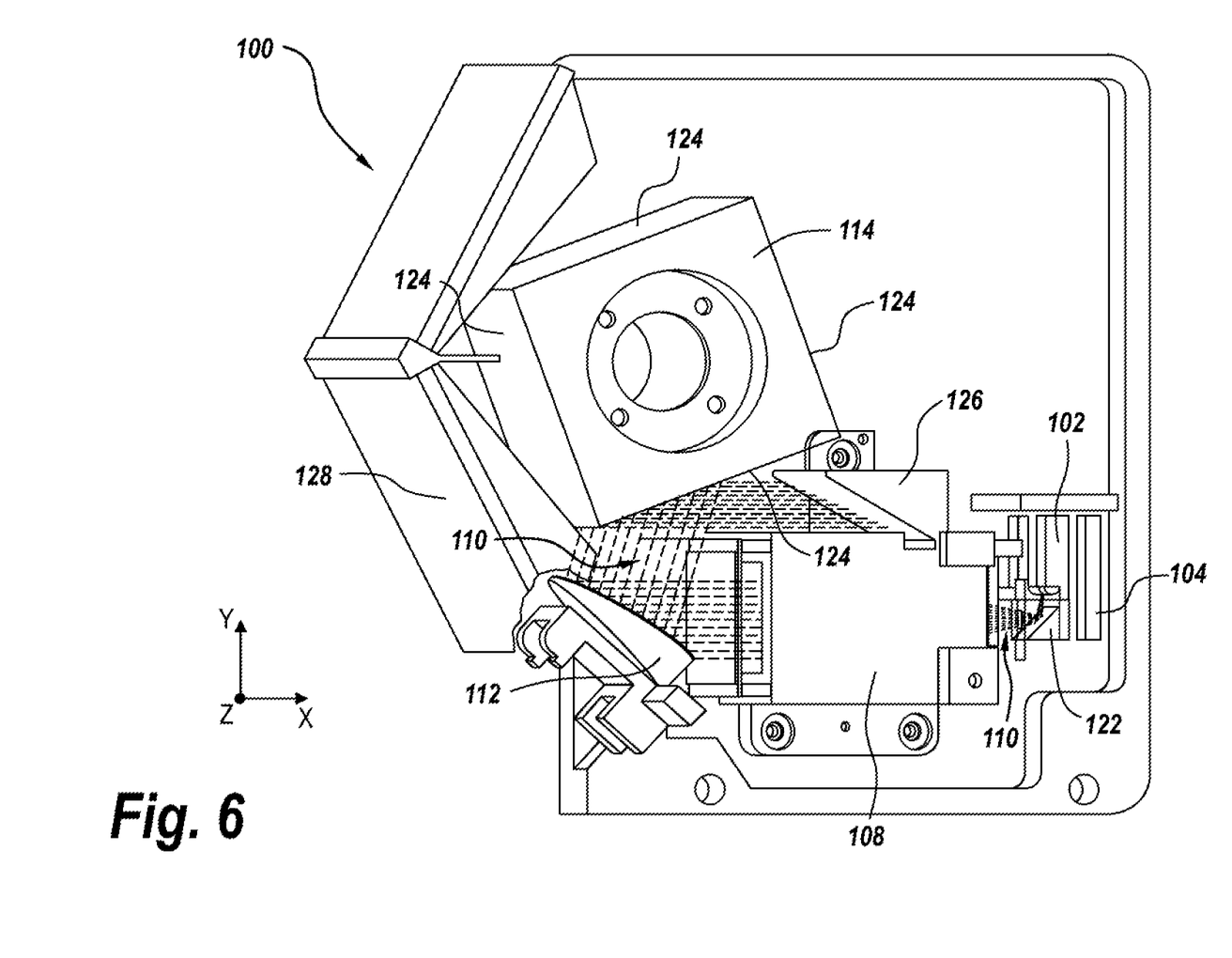
FIG. 6 is an overhead perspective view of the LiDAR system of FIG. 4.
Figure 7:
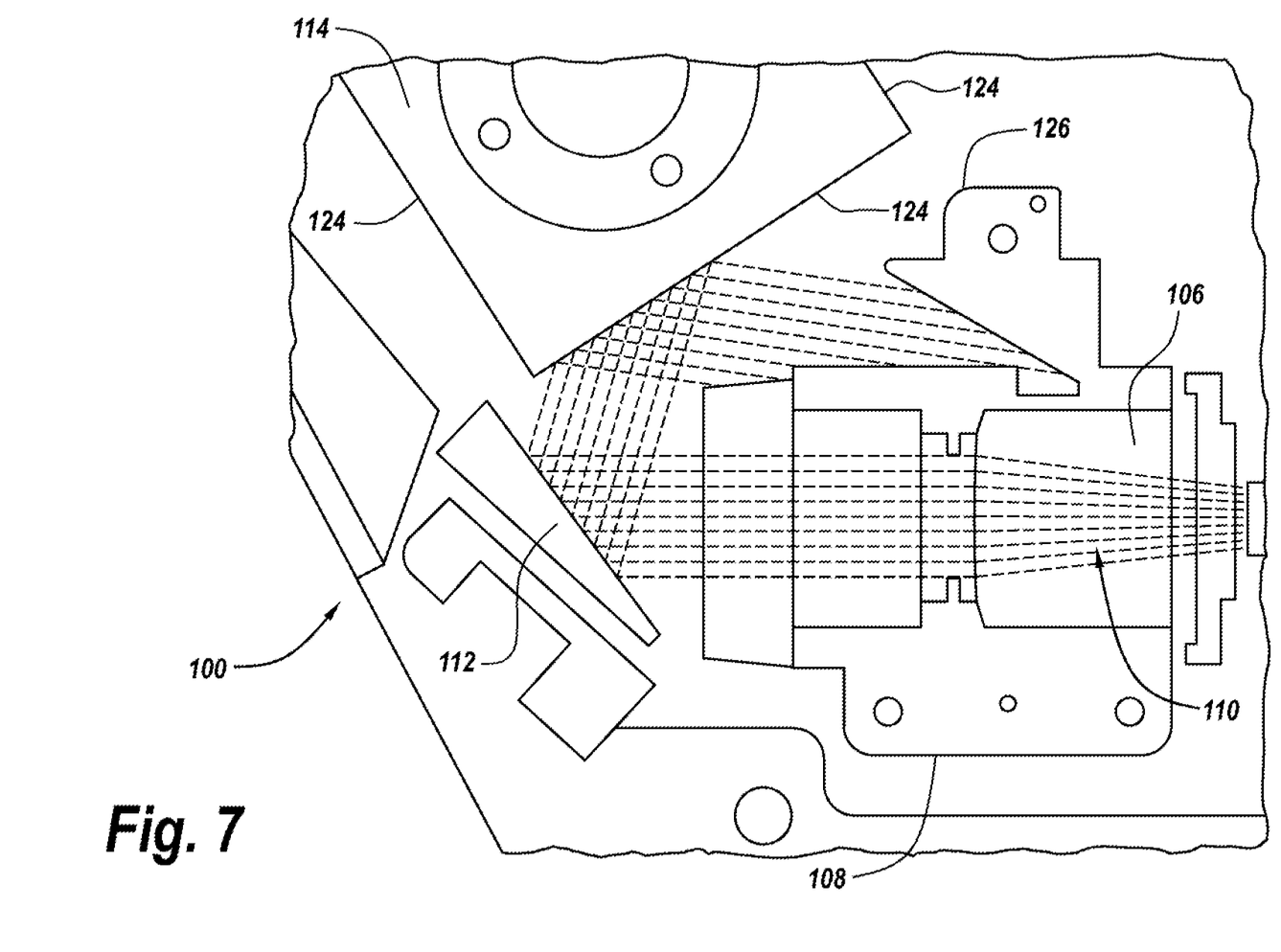
FIG. 7 is a cross-sectional view of FIG. 5, taken along the x-y plane through the center of the system.

FIGS. 1-3 show a positioning of the movable optical elements 112, 114 that causes the transmitted light beams 110 to be output from the system 100. After being output, some of the transmitted light beams 110 reflect off objects within the surrounding environment and are returned to the detection system. The returning light beams 120 follow the reverse path of the transmitted light beams 110, being redirected from the reflective member 114 to the wedge mirror 112, and then through the lens 106. After passing through the lens 106, the retuning light beams 120 are received by the detectors 104. A beams splitter 122 is disposed between the lens 108 and both the optical source 102 and detectors 104, allowing the optical source 102 and detectors 104 to be arranged in a coaxial configuration. The beam splitter 122 can be one of the many types of known beam splitters, such as wavelength dependent or polarized. In other cases, the beam splitter 122 can simply reflect a portion of all light that hits it while allowing a portion of the light to pass through. As shown, the beam splitter 122 is configured to redirect some light (e.g. light transmitted from the optical source 102) while allowing other light to pass through (e.g. returning light for receipt by detectors 104). The detectors 104 generate an electrical signal indicative of the optical energy detected from the returning light beams 120. The system 100 includes, or is connected to, a processor (not distinctly shown) which processes the electrical signal to generate data related to the position of detected objects within the environment.

FIGS. 4-7 show a positioning of the movable optical elements 112, 114 where transmitted light beams 110 are redirected from the reflective member 114 into a portion of the lens housing 108 containing a reference optical element 126. The reference optical element 126 can include a reference surface or a light trap and generates a reference signal based on the received transmitted light beam 110. After a reference signal is generated, the processor uses the reference signal to adjust the electrical signal from the detectors 104 to make a more accurate determination of the position of external objects, as will be discussed in more detail below. Since the environment is not being scanned by the transmitted light beams 110 in the position of FIGS. 4-7, this position occurs only occasionally within a given scan cycle.

Figure 8:
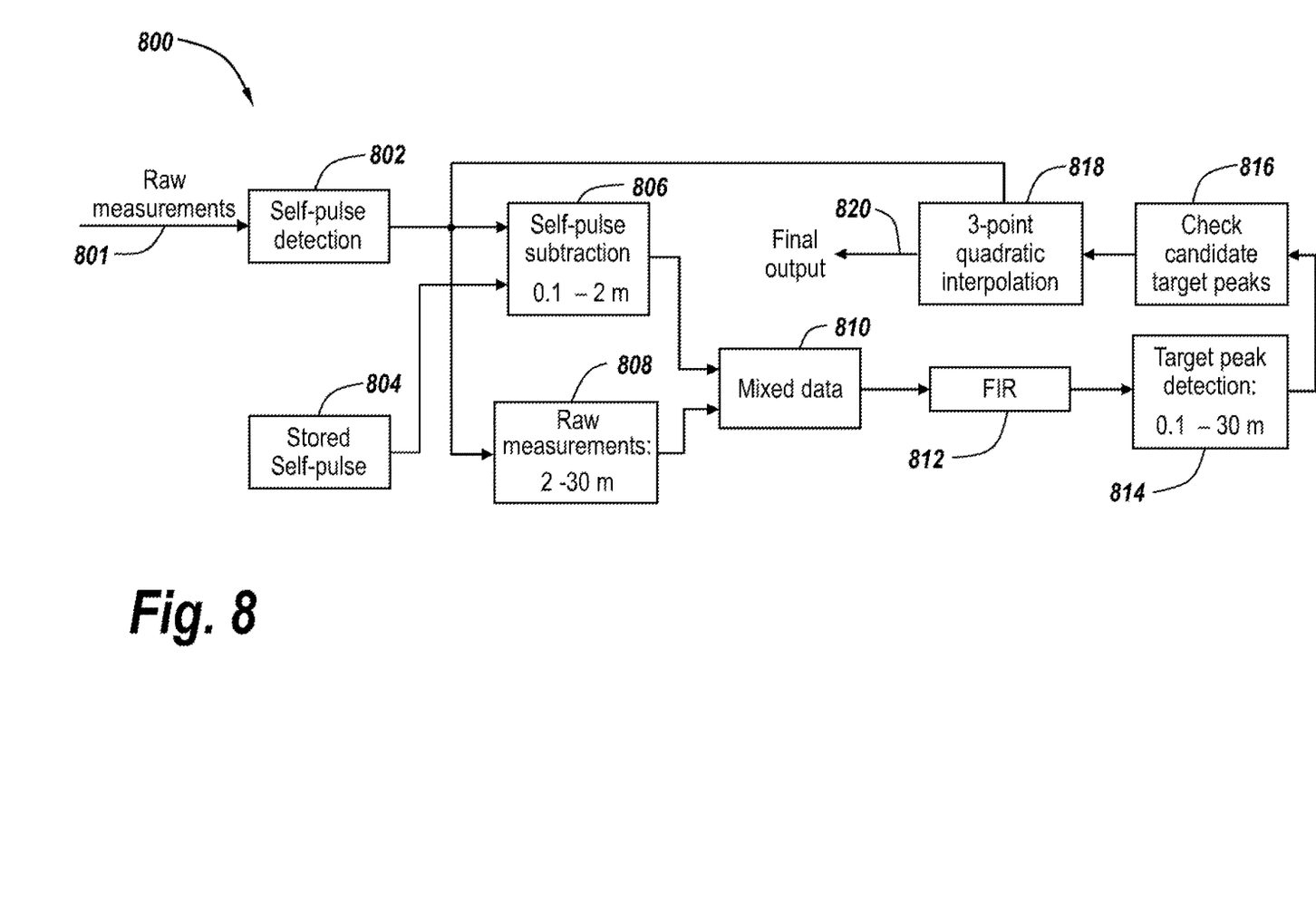
FIG. 8 is a block diagram of a method of operating a LiDAR system in accordance with the subject technology.

Referring now to FIG. 8, a block diagram 800 of a method of adjusting a detected electrical signal in accordance with the subject technology is shown. The diagram 800 shows a detection system operating in a low gain environment. During operation, the detection system scans the environment, gathering and storing raw measurements of the detected signals 801. Included within those measurements are self-pulses which are detected at block 802. This can be done by utilizing a reference surface (e.g. a light trap) as described above. The transmitted LiDAR beams are periodically directed towards the reference surface, at which point a reference signal is generated, indicative of the self-pulse of the system. Self-pulses are then stored at block 804. Measurements representative of targets between 0.1 m and 2 m away may be subject to inaccuracies due to self-pulse detection in the low gain system. Therefore, at block 806, the stored self-pulse is subtracted from the raw measured electrical signal for targets between 0.1 m and 2 m. On the other hand, raw measurements for targets between 2-30 m are stored at block 808, and no adjustment is made based on the stored self-pulse.

The data is combined at block 810, and the mixed data is then provided to a finite impulse response (FIR) filter 812 for processing within a processor. The processor first identifies target peaks for potential targets within a 0.1 m to 30 m range at block 814. After potential target peaks are identified, the candidate target peaks are checked at block 816, to see if the peak is above a defined threshold. During this process, features are extracted including target pulse width and target amplitude difference, and a classifier is applied to separate the real target from pulse noise. After the candidate target peaks are checked, the processor carries out 3-point quadratic interpolation at block 818. The initial range index from block 816 is an integer and can have large quantization error. The 3-point interpolation uses the amplitude of three samples to obtain a fractional range part. The processor then outputs the final determination of the position of any targets within the scanned area at block 820, based on the addition of the integer range and fractional range parts.

Figure 9:
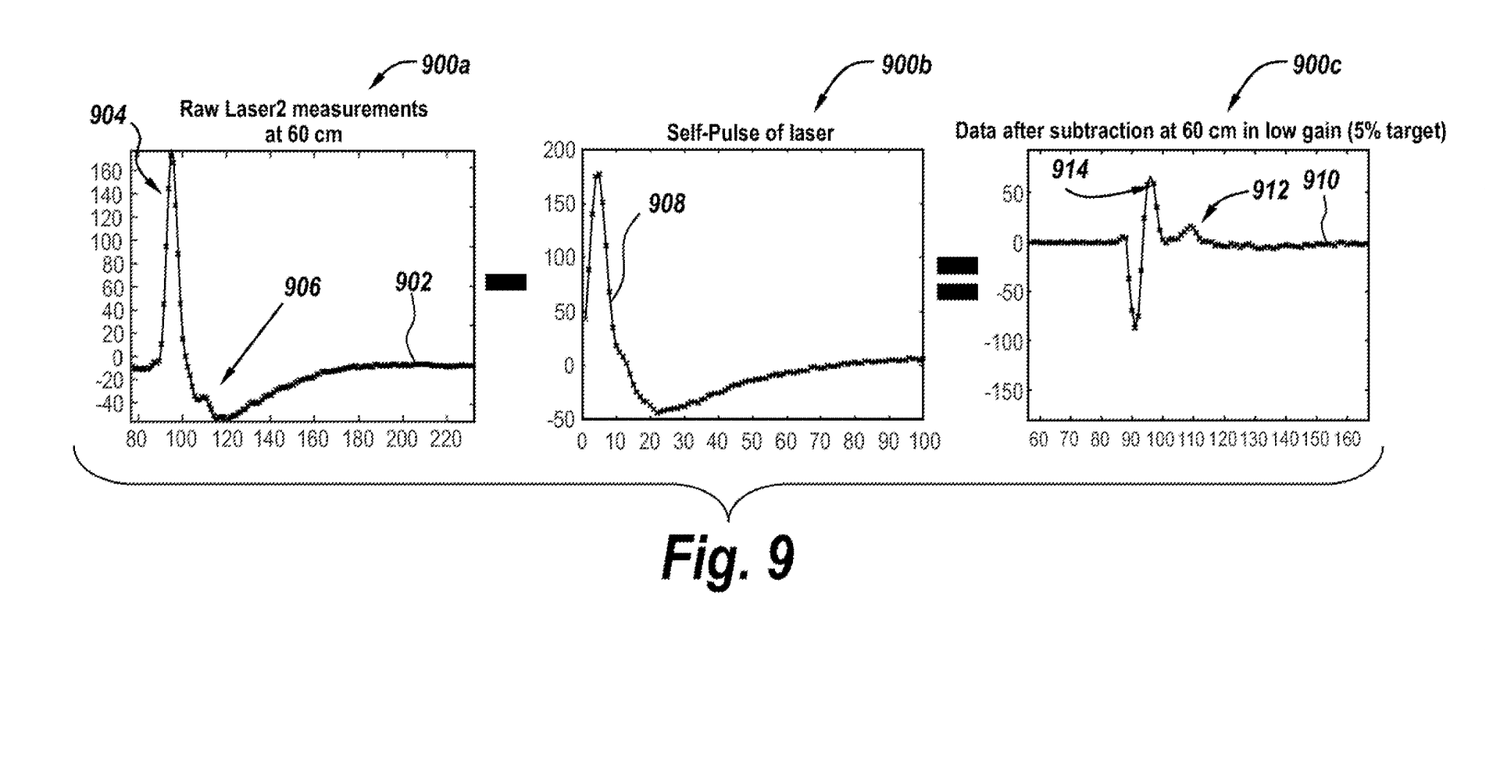
FIG. 9 represents graphs depicting subtracting the self-pulse of a LiDAR system in accordance with the method shown in FIG. 8.

Referring now to FIG. 9, graphs 900a-900c (generally 900) show a FIR algorithm utilizing a method of self-pulse subtraction in accordance with the subject technology, with the y axis representing signal amplitude and the x axis representing a sample number for a single laser firing. In particular, in graph 900a, the y axis is ADC raw amplitude. In graph 900b, the y axis is amplitude—a mean amplitude. In graph 900c, the y axis is the amplitude represented by the difference of the raw data amplitude and the self pulse amplitude. The graphs 900 represent exemplary calculations carried out by the FIR filter 812 as part of the process shown in FIG. 8.

A FIR matched filter is an optimal detector for Gaussian noise. However, FIR is normally ineffective for close targets in low gain. This can be because the target pulse and self-pulse are merged into one peak which results in one peak for FIR output. Further, low reflective targets with low pulse amplitudes can be located in the negative section of self-pulse which results in missed detection of low reflective target.

Referring now to graph 900a, a graph of the raw signal measurement is shown. Graph line 902 represents an exemplary received signal which includes the detection of a target at 202 cm. The signal experiences a large spike 904 self-pulse. The signal 902 also includes a peak 906 caused by the detection of a target, which is obscured by the self-pulse 904 in graph 900a.

Graph 900b shows the signal line of the self-pulse alone, represented by graph line 908. If the self-pulse 908 is removed from the raw signal measurement 902, the FIR algorithm can be much more accurately applied to detect very close and close targets. Therefore, graph 900c shows a graph line 910 with the self-pulse 908 subtracted from the raw signal measurement 902. Once the self-pulse 908 is subtracted, the true target peak 912 is much more easily identifiable. This method of subtracting the self-pulse is effective to detect low reflective targets in low gain, even when those targets are very close (e.g. between 0.1 m and 2 m), particularly when the self-pulse is stable.

If the self-pulse varies significantly (amplitude, pulse width, negative overshooting, positive overshooting), it is sometimes more difficult to remove the self-pulse 908 from the raw signal measurement 902. This is due to potential false peaks, such as false peak 914. Therefore, in such conditions, attempting self-pulse subtraction may generate false peaks in low gain environments. The false target can be recognized by the classifier, as mentioned in step 816. In particular, the first peak 914 represents the false peak caused by self-pulse which can be present if self-pulse is not subtracted out corrected. Even with the attempted subtraction of self-pulse, there may be some residual from the peak 914. In some cases, the first peak 914 can be assumed to be a residual peak caused due to subtraction of the self-pulse. The first peak 914 can then be considered to be at range 0 m, and the second peak 912 will have a distance=(position of the second peak 912–position of the residual peak 914)*resolution. In any case, the system can make a determination as to whether the self-pulse is stable and only carry out the method of self-pulse subtraction if the self-pulse is stable.

Figure 10:
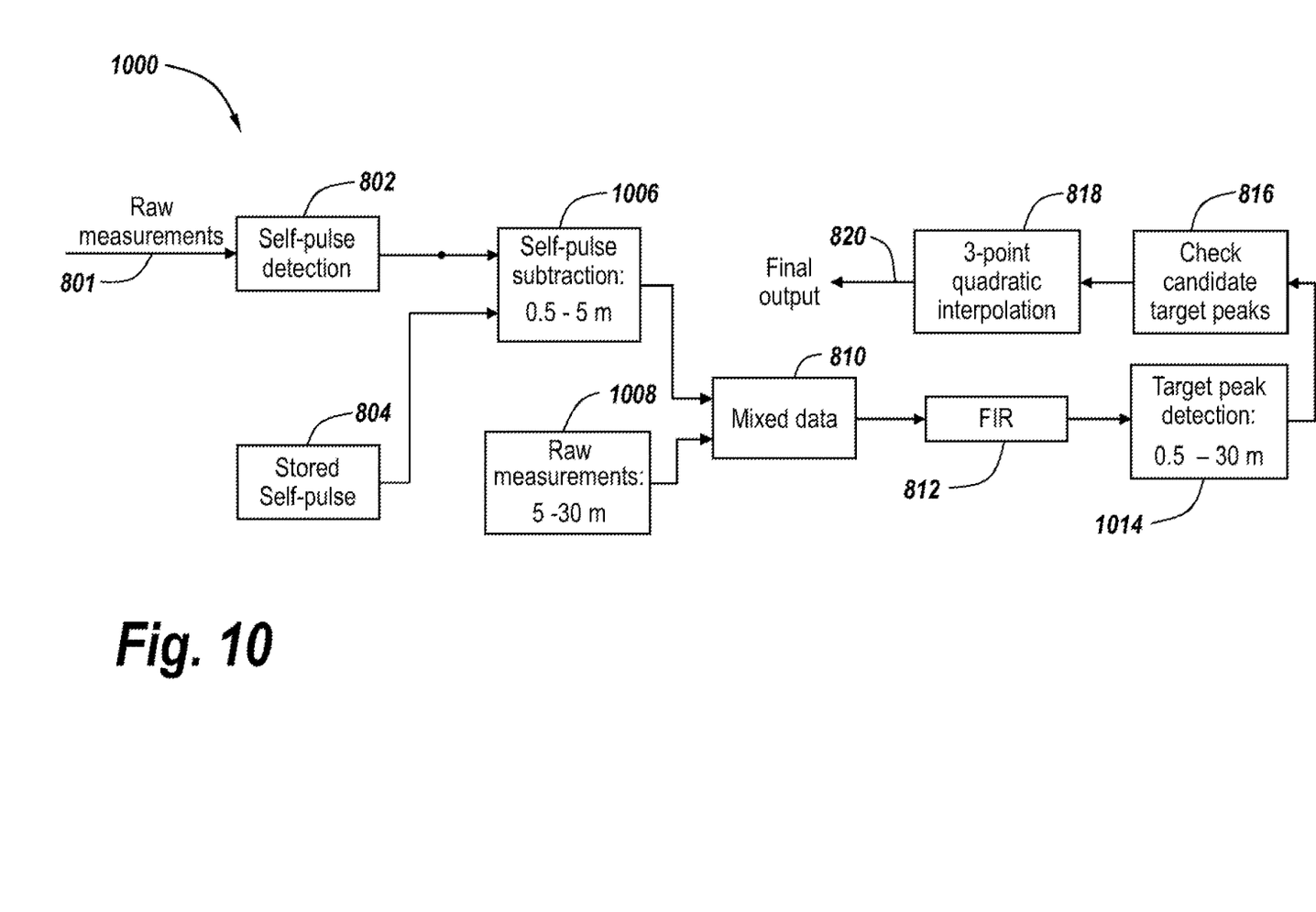
FIG. 10 is a block diagram of a method of operating a LiDAR system in accordance with the subject technology.

Referring now to FIG. 10, a block diagram 1000 of a method of adjusting a detected electrical signal in accordance with the subject technology is shown. The method shown in diagram 1000 is similar to the method of diagram 800, except as otherwise shown and described. In particular, the method of block diagram 1000 is carried out in a high gain environment, rather than low gain.

As the LiDAR system scans, the detectors detect a raw signal 801. Periodically, self-pulses are detected from the generated reference signal, at block 802, which are then stored at block 804. In the high gain environment, LiDAR systems are ordinarily blind for the first 1.5 m due to the effects of self-pulse. However, utilizing the methods described herein, the system is able to reliably reduce the blind range from 1.5 m to 0.5 m. Therefore, at block 1006, the stored self-pulse is subtracted from the raw measured electrical signal for targets between 0.5 m and 5 m. A larger threshold of 0.5 m to 5 m is used (for the high gain system) because significant overshooting exists in high gain, and a larger threshold results in the removal of false positives from overshooting at close distances.

Raw measurements for targets between 5-30 meters are stored at block 1008, and no adjustment is made based on the stored self-pulse. The data is combined at block 810 and provided to a FIR filter 812 for processing within a processor. The processor then identifies target peaks for potential targets within a 0.5 m to 30 m range at block 1014, checks the candidate target peaks at block 816, and then carries out 3-point quadratic interpolation at block 818. The processor then generates and outputs the final determination of the position of any targets within the scanned area at block 820.

Figure 11:
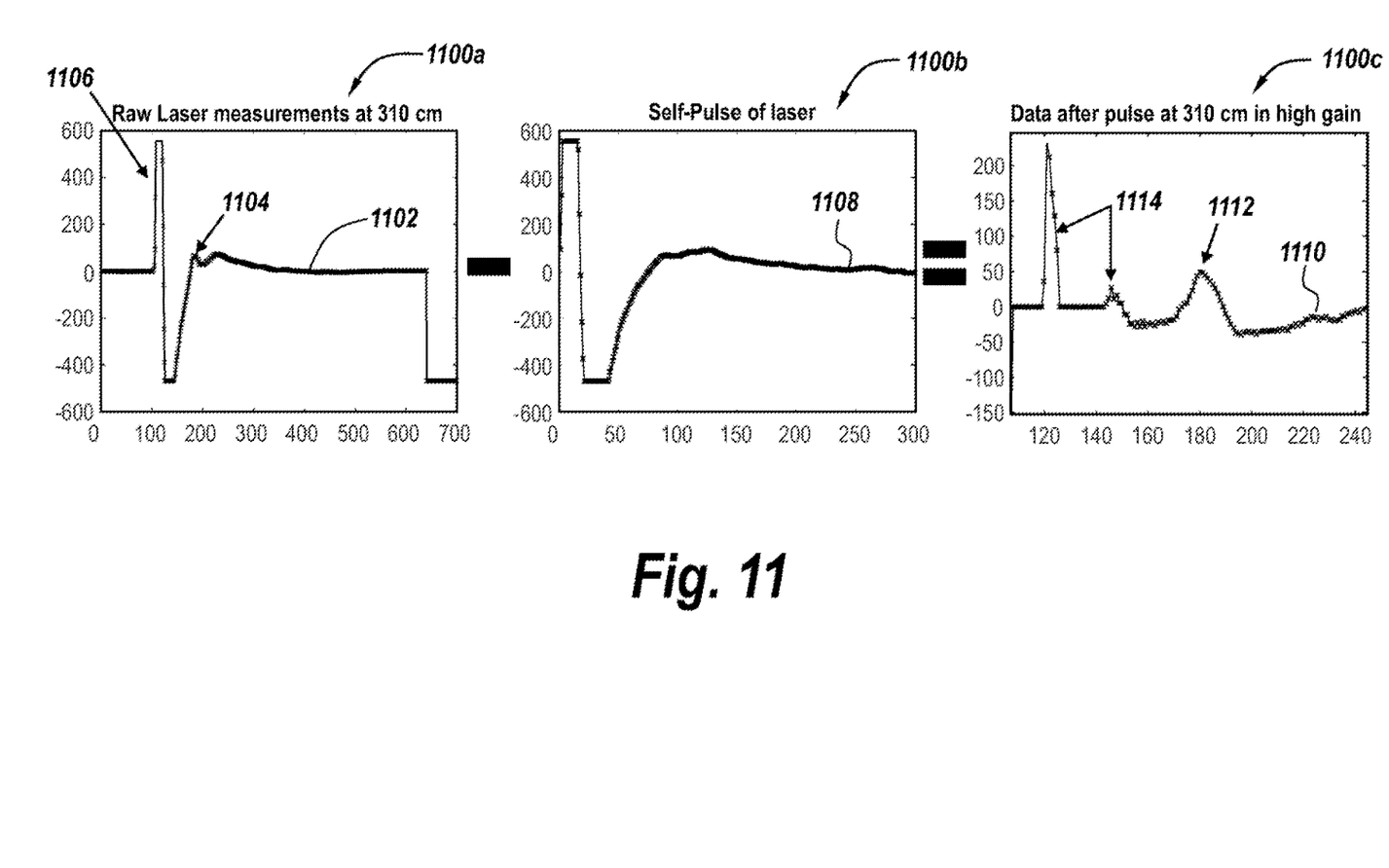
FIG. 11 represents graphs depicting subtracting the self-pulse of a LiDAR system in accordance with the method shown in FIG. 10.

Referring now to FIG. 11, graphs 1100a-1100c (generally 1100) showing a FIR algorithm utilizing a method of self-pulse subtraction in accordance with the subject technology are shown. The graphs 1100 represent exemplary calculations carried out by the FIR filter 812 as part of the high gain process shown in FIG. 10.

Referring now to graph 1100a, a graph of the raw signal measurement from a detector is shown, represented by graph line 1102, which includes a target detection at 310 cm. The signal experiences a large spike due self-pulse 1104. The signal also includes a peak 1106 caused by the detection of a target, which is obscured by the self-pulse 1104 in graph 1100a.

Graph 1100b shows the signal of the self-pulse alone, represented by graph line 1108. The self-pulse 1108 is then subtracted from the raw signal measurement 1102 to generate graph line 1110 of graph 1110c. Once self-pulse 1108 is subtracted, the true target peak 1112 is much more easily identifiable. However, in the example of graph 1110c, variations in self-pulse amplitude and width also result in false peaks 1114. Therefore, in some cases, the method of self-pulse subtraction can be selectively carried out only when a determination is made that no variations in self-pulse are present. In this way, the subject technology is able to eliminate blind areas at close range and improve detection accuracy of the LiDAR system.

It is noted that the present disclosure describes one or more LiDAR systems which can be installed in a vehicle, such as an automobile. It will be understood that the embodiments of LiDAR systems of the subject disclosure are applicable to any kind of vehicle, e.g., bus, train, etc. Also, the scanning LiDAR systems of the present disclosure need not be associated with any kind of vehicle.

Whereas many alterations and modifications of the disclosure will become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations to those particular embodiments may occur in systems and methods practicing the subject technology described herein, as should be understood by one skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the inventive concept as defined by the following claims.

The invention claimed is:

1. A LiDAR system, comprising:
an optical source for generating an optical signal;
a first movable optical element having an at least partially optically reflective surface for redirecting the optical signal, the first movable optical element being movable through a plurality of positions corresponding to a respective plurality of directions of the optical signal reflected from the movable optical element, a plurality of first directions from the respective plurality of directions resulting in an output optical signal being directed though an output of the LiDAR system to an external region, and at least one second direction from the respective plurality of directions resulting in the optical signal being reflected from the movable optical element to a reference optical element of the system, the reference optical element being adapted to return a reference signal indicative of a self-pulse of the LiDAR system;
a detector for detecting optical energy and generating an electrical signal indicative of the optical energy detected by the detector; and
a processor for receiving and storing the electrical signal indicative of the optical energy and the reference signal, the processor configured determine a position of at least one object by adjusting the electrical signal indicative of the optical energy detected by the detector using the reference signal.

2. The LiDAR system of claim 1, wherein the processor adjusts the electrical signal by subtracting the reference signal.

3. The LiDAR system of claim 1, wherein the reference optical element is a light trap.

4. The LiDAR system of claim 1, wherein the first movable optical element is rotatable about an axis and is polygonal in a cross-section taken orthogonal to the axis.

5. The LiDAR system of claim 4, wherein the first movable optical element is rotatable about the axis to scan the output optical signal over the external region in a first dimension.

6. The LiDAR system of claim 1, further comprising a second movable optical element disposed optically between the optical source and the first movable optical element.

7. The LiDAR system of claim 6, wherein:
the first movable optical element is rotatable about an axis and is polygonal in cross section orthogonal to the axis; and
the second movable optical element is a wedge mirror.

8. The LiDAR system of claim 7, wherein the first movable optical element is rotatable to scan the output optical signal over the external region in a first dimension.

9. The LiDAR system of claim 8, wherein the second movable optical element is movable to scan the output optical signal over the external region in a second dimension orthogonal to the first dimension.

10. The LiDAR system of claim 1, wherein the processor is configured to determine whether a pulse shape of the reference signal is stable and adjust the electrical signal by subtracting the reference signal from the electrical signal only when the pulse shape of the reference signal is stable.

11. A method for detecting objects in an external region using a LiDAR system comprising:
- transmitting a plurality of optical signals with a plurality of LiDAR transmitters;
- positioning a plurality of LiDAR detectors coaxially with the LiDAR transmitters;
- providing a first movable optical element having an at least partially optically reflective surface;
- positioning the first movable optical element to redirect the optical signals from the LiDAR transmitters, wherein the first movable optical element is configured to redirect light between a plurality of directions including a plurality of first directions and at least one second direction, the first directions resulting in an output optical signal being output into the external region and the at least one second direction resulting in the optical signals being transmitted to a reference optical element;
- detecting, by the LiDAR detectors, returning optical signals, and generating an electrical signal indicative of optical energy detected;
- generating, by the reference optical element, a reference signal indicative of a self-pulse of the LiDAR system in response to the optical signal being transmitted to the reference optical element; and
- determining a position of at least one object in the external region by adjusting the electrical signal indicative of optical energy detected using the reference signal.

12. The method of claim 11, wherein the processor adjusts the electrical signal by subtracting the reference signal.

13. The method of claim 11, wherein the reference optical element is a light trap.

14. The method of claim 11, wherein the first movable optical element is rotatable about an axis and is polygonal in a cross-section taken orthogonal to the axis.

15. The method of claim 14, wherein the first movable optical element is rotated about the axis to scan the output optical signal over the external region in a first dimension.

16. The method of claim 11, further comprising:
- providing a second movable optical element having an at least partially optically reflective surface; and
- positioning the second movable optical element optically between the LiDAR transmitters and the first movable optical element, the second optical element configured to redirect light between the LiDAR transmitters and the first movable optical element.

17. The method of claim 16, wherein:
- the first movable optical element is rotated about an axis and is polygonal in a cross section orthogonal to the axis; and
- the second movable optical element is a wedge mirror.

18. The method of claim 17, wherein the first movable optical element is rotated to scan the output optical signal over the external region in a first dimension.

19. The method of claim 18, wherein the second movable optical element is moved to scan the output optical signal over the external region in a second dimension orthogonal to the first dimension.

20. The method of claim 11, wherein the processor is configured to determine whether a pulse shape of the reference signal is stable and adjust the electrical signal by subtracting the reference signal from the electrical signal only when the pulse shape of the reference signal is stable.

\* \* \* \* \*